United States Patent
Boo et al.

(10) Patent No.: US 9,276,800 B2
(45) Date of Patent: Mar. 1, 2016

(54) SINGLE FREQUENCY SYNTHESIZER BASED FDD TRANSCEIVER

(75) Inventors: Hyun Ho Boo, Incheon (KR); Seon-Ho Han, Daejeon (KR); Jang Hong Choi, Daejeon (KR); Ik Soo Eo, Daejeon (KR); Hyun Kyu Yu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 517 days.

(21) Appl. No.: 13/608,677

(22) Filed: Sep. 10, 2012

(65) Prior Publication Data

US 2013/0064148 A1 Mar. 14, 2013

(30) Foreign Application Priority Data

Sep. 14, 2011 (KR) .......... 10-2011-0092692
May 16, 2012 (KR) .......... 10-2012-0052200

(51) Int. Cl.
*H04J 1/02* (2006.01)
*H04L 27/38* (2006.01)
*H04L 27/20* (2006.01)
*H04L 27/233* (2006.01)
*H04L 27/36* (2006.01)
*H04B 1/00* (2006.01)

(52) U.S. Cl.
CPC .......... *H04L 27/3836* (2013.01); *H04L 27/206* (2013.01); *H04L 27/2092* (2013.01); *H04L 27/2332* (2013.01); *H04L 27/362* (2013.01); *H04L 27/3854* (2013.01); *H04B 1/0007* (2013.01)

(58) Field of Classification Search
CPC .............. H04L 27/3836; H04L 27/06
USPC ................ 370/280, 281, 29; 455/73
See application file for complete search history.

(56) References Cited

U.S. PATENT DOCUMENTS

| | | | |
|---|---|---|---|
| 4,061,973 A * | 12/1977 | Reimers et al. ............. | 455/76 |
| 4,231,116 A * | 10/1980 | Sekiguchi et al. ........... | 455/87 |
| 4,246,539 A * | 1/1981 | Haruki et al. ................ | 455/76 |
| 5,465,409 A * | 11/1995 | Borras et al. ................ | 455/260 |
| 5,475,677 A * | 12/1995 | Arnold et al. ............... | 370/280 |
| 5,648,985 A * | 7/1997 | Bjerede et al. .............. | 375/219 |
| 5,852,603 A * | 12/1998 | Lehtinen et al. ............. | 370/280 |

(Continued)

FOREIGN PATENT DOCUMENTS

KR 20040065021 A 7/2004
WO WO 2009066866 A1 * 5/2009 ............. H04B 7/155

OTHER PUBLICATIONS

Michiel Steyaert et al., "TP 3.3: A Single-Chip CMOS Transceiver for DCS-1800 Wireless Communications", Digest of Technical Papers, Feb. 5-7, 1998, pp. 48-49, vol. 411.

(Continued)

*Primary Examiner* — Parth Patel
(74) *Attorney, Agent, or Firm* — Rabin & Berdo, P.C.

(57) ABSTRACT

The present invention relates to a single frequency synthesizer based FDD transceiver. A single frequency synthesizer generates and provides a carrier frequency so that frequency up-conversion and frequency down-conversion can be performed at the time of transmission and reception. Accordingly, the area, power consumption, and design complexity of the entire system can be reduced, and the performance of the system can be improved.

9 Claims, 8 Drawing Sheets

(56) References Cited

U.S. PATENT DOCUMENTS

| | | | |
|---|---|---|---|
| 5,956,326 A * | 9/1999 | Magana | 370/277 |
| 6,009,313 A * | 12/1999 | Ichiyoshi | 455/76 |
| 6,226,274 B1 * | 5/2001 | Reese et al. | 370/280 |
| 6,256,511 B1 * | 7/2001 | Brown et al. | 455/552.1 |
| 6,449,264 B1 * | 9/2002 | Lehtinen et al. | 370/328 |
| 6,501,337 B1 * | 12/2002 | Tucker | 331/17 |
| 7,058,364 B2 * | 6/2006 | Atkinson et al. | 455/76 |
| 7,065,327 B1 * | 6/2006 | Macnally et al. | 455/78 |
| 7,443,906 B1 * | 10/2008 | Bang et al. | 375/140 |
| 7,636,554 B2 * | 12/2009 | Sugar et al. | 455/73 |
| 7,676,244 B2 * | 3/2010 | Park et al. | 455/552.1 |
| 2001/0031627 A1 * | 10/2001 | Ries | 455/258 |
| 2006/0025099 A1 * | 2/2006 | Jung et al. | 455/313 |
| 2006/0050810 A1 * | 3/2006 | Haque et al. | 375/297 |
| 2006/0067429 A1 * | 3/2006 | Beyer et al. | 375/309 |
| 2006/0258311 A1 * | 11/2006 | Pestryakov et al. | 455/165.1 |
| 2007/0099571 A1 * | 5/2007 | Withers et al. | 455/67.11 |
| 2007/0243832 A1 * | 10/2007 | Park et al. | 455/73 |
| 2008/0198776 A1 * | 8/2008 | Seo | 370/280 |
| 2008/0310318 A1 * | 12/2008 | Bang et al. | 370/252 |
| 2009/0075601 A1 * | 3/2009 | Nezhad-Ahmadi et al. | 455/73 |
| 2009/0075612 A1 * | 3/2009 | Keehr et al. | 455/226.1 |
| 2009/0117859 A1 * | 5/2009 | Smith et al. | 455/78 |
| 2009/0130989 A1 * | 5/2009 | Rousu et al. | 455/73 |
| 2009/0168848 A1 * | 7/2009 | Constantinidis et al. | 375/140 |
| 2009/0168849 A1 * | 7/2009 | Rouxel | 375/140 |
| 2010/0118744 A1 * | 5/2010 | Kwon et al. | 370/278 |
| 2010/0135272 A1 * | 6/2010 | Dayal et al. | 370/343 |
| 2010/0165891 A1 * | 7/2010 | Lim | 370/278 |
| 2010/0271953 A1 * | 10/2010 | Kim et al. | 370/241 |
| 2011/0216757 A1 * | 9/2011 | Michel | 370/350 |
| 2011/0287711 A1 * | 11/2011 | Populus | 455/12.1 |

OTHER PUBLICATIONS

Josef Zipper et al., "A Single-Chip Dual-Band CDMA2000 Transceiver in 0.13 μm CMOS", IEEE Journal of Solid-State Circuits, Dec. 2007, pp. 2785-2794, vol. 42, No. 12.

Darabi, Khorram, Chien, Etc.; "A 2.4-Ghz CMOS Transceiver for Bluetooth"; Journal of Solid-State Circuits; vol. 36, No. 12; pp. 2016-2024; Dec. 2001.

* cited by examiner

SINGLE FREQUENCY SYNTHESIZER BASED FDD TRANSCEIVER

CROSS-REFERENCES TO RELATED APPLICATIONS

The present application claims priority under 35 U.S.C 119(a) to Korean Application Nos. 10-2011-0092692 and 10-2012-0052200, filed on Sep. 14, 2011 and May 16, 2012, in the Korean Intellectual Property Office, which are incorporated herein by reference in their entirety set forth in full.

BACKGROUND

Exemplary embodiments of the present invention relate to a single frequency synthesizer based frequency division duplex (FDD) transceiver, and more particularly, to a single frequency synthesizer based FDD transceiver which enables frequency up-conversion and frequency down-conversion using a single frequency synthesizer at the time of transmission and reception.

FIG. 1 shows the construction of a common wireless communication transceiver, FIG. 2 shows the construction of the transmitter of a common analog circuit-based direct conversion structure, FIG. 3 shows the construction of the transmitter of a common digital-IF structure, FIG. 4 shows the construction of the receiver of the common analog circuit-based direct conversion structure, and FIG. 5 shows the construction of the receiver of the common digital-IF structure.

In a wireless communication transceiver structure, such as that shown in FIG. 1, when transmission is performed, a digital front-end 111 performs digital signal processing. A transmitter 112 converts the digital output of the digital front-end 111 into analog output, filters an analog baseband signal, performs frequency up-conversion into a radio frequency (RF) band, and then performs power amplification. Next, a duplexer 114 sends the result signal to an antenna 115.

The transmitter 112 may include a direct conversion structure and a digital-intermediate frequency (IF) structure.

The direct conversion structure performs frequency up-conversion into an RF band frequency to be outputted at once. As shown in FIG. 2, in the transmitter of the analog circuit-based direct conversion structure, digital-analog converters (DACs) 211 and 212 first convert a digital baseband in-phase (I) signal and a digital baseband quadrature (Q) signal into respective analog baseband signals. At this time, generated images are removed by low pass filters 213 and 214.

Mixers 216 and 217 mix the analog baseband signals with respective RF carrier frequencies generated from a frequency synthesizer 215 and perform frequency up-conversion on the I signal and the Q signal. The converted I signal and the converted Q signal are summed. The summed signal is subject to power amplification through a power amplifier (PA) 219 after passing through a bandpass filter 218 and is then transmitted.

In contrast, as shown in FIG. 3, the transmitter of the digital-IF structure performs frequency up-conversion from baseband signals to low IF band signals and then performs frequency up-conversion from the low IF band signals to an RF band signal again.

More particularly, mixers 311 and 312 perform frequency up-conversion from a digital baseband I signal and a digital baseband Q signal into IF band signals in the digital region. The IF band signals are summed. A DAC 314 converts the summed signal into an analog signal. At this time, a generated image is removed by a low pass filter 315.

Here, an IF may be obtained by a numerically controlled oscillator (NCO) 313.

A mixer 317 mixes the analog signal with an RF carrier generated from a frequency synthesizer 316 and performs frequency up-conversion from the mixed signal to an RF band signal. The RF band signal is subject to power amplification through a PA 319 after passing through a bandpass filter 318 and is then transmitted.

The digital-IF structure does not have a problem, such as the leakage of a local oscillator (LO) or a DC offset, as compared with a direct conversion structure.

Meanwhile, in a wireless communication transceiver structure, such as that shown in FIG. 1, when reception is performed, an RF band signal is received through the antenna 115 and the duplexer 114. A receiver 113 performs low-noise signal amplification on the RF band signal, performs frequency down-conversion from the amplified signal to a baseband signal, performs analog signal processing and analog-digital conversion on the baseband signal, and inputs the resulting signal to the digital front-end 111.

Like the transmitter 112, the receiver 113 also has a direct conversion structure and a digital-IF structure.

As shown in FIG. 4, in the receiver of the common analog circuit-based direct conversion structure, frequency down-conversion from an RF band signal to a baseband signal is performed at once.

A low noise amplifier (LNA) 411 amplifies the RF band signal received from the antenna 115 via the duplexer 114 in the state in which low noise remains. Mixers 412 and 413 mix the amplified RF band signal with carriers generated from a frequency synthesizer 416 and perform frequency down-conversion from the mixed signals to baseband signals.

Low pass filters 414 and 415 remove frequency signals that may be aliased from the baseband signals. ADCs 417 and 418 convert the respective analog signals into a digital baseband I signal and a digital baseband Q signal.

In contrast, as shown in FIG. 5, the receiver of the digital-IF structure performs down-conversion into a low IF band signal and then performs frequency down-conversion from the low IF band signal to a baseband signal again.

More particularly, an LNA 511 performs low-noise amplification on a received signal. Mixers 512 and 513 mix the amplified signal with carriers generated from a frequency synthesizer 516 and perform frequency down-conversion from the mixed signals to primary IF band signals. Low pass filters 514 and 515 remove aliasing images from the primary IF band signals. ADCs 517 and 518 convert the analog IF band signals into digital IF band signals. A digital mixer 519 mixes the digital IF band signals and performs frequency down-conversion from the mixed IF band signal into a baseband signal again. Here, the IF may be obtained by an NCO 520.

As described above, the wireless communication transceiver requires two or more PLL (phase locked loop) frequency synthesizers. In the frequency division dual mode of an FDD, a transmitter frequency band and a receiver frequency band are separately set, and a transceiver performs transmission and reception at the same time. Thus, frequency synthesizers are used in a transmitter and a receiver, respectively, in order to vary the transmission frequency and the reception frequency independently.

That is, each of the transmitter and the receiver of the direct conversion structure requires one frequency synthesizer, and the digital-IF structure requires a frequency synthesizer for up-conversion from an IF band signal to an RF band signal and a frequency synthesizer for down-conversion from an RF band signal to an IF band signal.

Furthermore, a superheterodyne structure is also widely used in addition to the direct conversion structure or the digital-IF structure. The superheterodyne structure requires two frequency synthesizers in each of a transmitter and a receiver.

As described above, in the FDD system, the transceiver requires two or more frequency synthesizers because transmission and reception are performed at the same time and the transmitter and the receiver cannot share the frequency synthesizer unlike in a time division duplex (TDD) system. Accordingly, the FDD system is problematic in that the area, power consumption, and design complexity of the entire system are increased.

A related prior art includes U.S. Patent Application Publication No. 2009/0075601, entitled Low-IF Transceiver Architecture (Mar. 19, 2009).

SUMMARY

An embodiment of the present invention relates to a single frequency synthesizer based FDD transceiver which enables frequency up-conversion and frequency down-conversion using a single frequency synthesizer at the time of transmission and reception.

In one embodiment, a single frequency synthesizer based FDD transceiver includes a transmission signal processor configured to perform frequency up-conversion from baseband signals into IF band signals, receive information on a transmission frequency and information on a reception frequency, generate an IF for frequency up-conversion from the transmission frequency and the reception frequency to the IF band signals, and compensate for the IF of the transmission frequency and the reception frequency; a transmitter configured to convert the digital IF band signals, up-converted by the transmission signal processor, into analog signals, remove noise from the analog signals, perform frequency up-conversion from the analog signals into RF band signals, amplify the RF band signals, and output the amplified RF band signal; a duplexer configured to send the RF band signal, outputted from the transmitter, through an antenna; a receiver configured to perform low-noise signal amplification on the RF band signal received from the antenna via the duplexer and perform frequency down-conversion and analog signal processing on the amplified RF band signal; and a frequency synthesizer configured to generate a carrier frequency for the frequency up-conversion in the transmitter and the frequency down-conversion in the receiver.

In the present invention, the transmission signal processor includes a digital filter configured to sample the baseband signals and remove sampling images from the baseband signals; an IF up-converter configured to perform the frequency up-conversion from the signals, filtered by the digital filter, into the IF bands; and an IF generation and compensation unit configured to receive the information on the transmission frequency and the information on the reception frequency, generate the IF necessary for the frequency up-conversion in the IF band signals, and compensate for the IF.

In the present invention, the digital filter up-samples the baseband signals.

In the IF generation and compensation unit of the present invention, the compensation for the IF is performed based on a difference between the transmission frequency and the reception frequency.

The carrier frequency generated from the frequency synthesizer of the present invention is a reception frequency.

In the present invention, the receiver has a direct conversion structure or a digital-IF structure.

In another embodiment, a single frequency synthesizer-based FDD transceiver includes a transmitter configured to filter an analog baseband signal, perform frequency up-conversion from the analog baseband signal to an RF band signal, and amplify transmission power of the RF band signal; a duplexer configured to send the RF band signal, amplified by the transmitter, through an antenna; a receiver configured to perform low-noise signal amplification on the RF band signal received from the antenna via the duplexer, perform frequency down-conversion from the RF band signal to intermediate frequency (IF) band signals, and convert the IF band signals into digital IF band signals; a reception signal processor configured to perform frequency down-conversion from the digital IF band signals of the receiver to the baseband signals, sample the baseband signals, output the sampled baseband signals, receive information on a transmission frequency and information on a reception frequency, generate an IF for frequency down-conversion from the transmission frequency and the reception frequency to the baseband signals, and compensate for the IF of the transmission frequency and the reception frequency; and a frequency synthesizer configured to generate a carrier frequency for the frequency up-conversion in the transmitter and for the frequency down-conversion in the receiver.

In the present invention, the transmitter has a direct conversion structure or a digital-IF structure.

In the present invention, the reception signal processor includes an IF down-converter configured to perform frequency down-conversion from the digital IF band signals to the baseband signals; an IF generation and compensation unit configured to generate the IF necessary for the frequency down-conversion from the IF band signals to the baseband signals, receive the information on the transmission frequency and the information on the reception frequency, and compensate for the IF of the transmission frequency and the reception frequency; and a digital filter configured to sample the baseband signals converted by the IF down-converter and output the sampled signals.

In the IF generation and compensation unit of the present invention, the compensation for the IF is performed based on a difference between the transmission frequency and the reception frequency.

The carrier frequency generated from the frequency synthesizer of the present invention, is a transmission frequency.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of a single frequency synthesizer based FDD transceiver in accordance with the present invention will be described with reference to accompanying drawings. However, the embodiments are for illustrative purposes only and are not intended to limit the scope of the invention.

Figure 1:
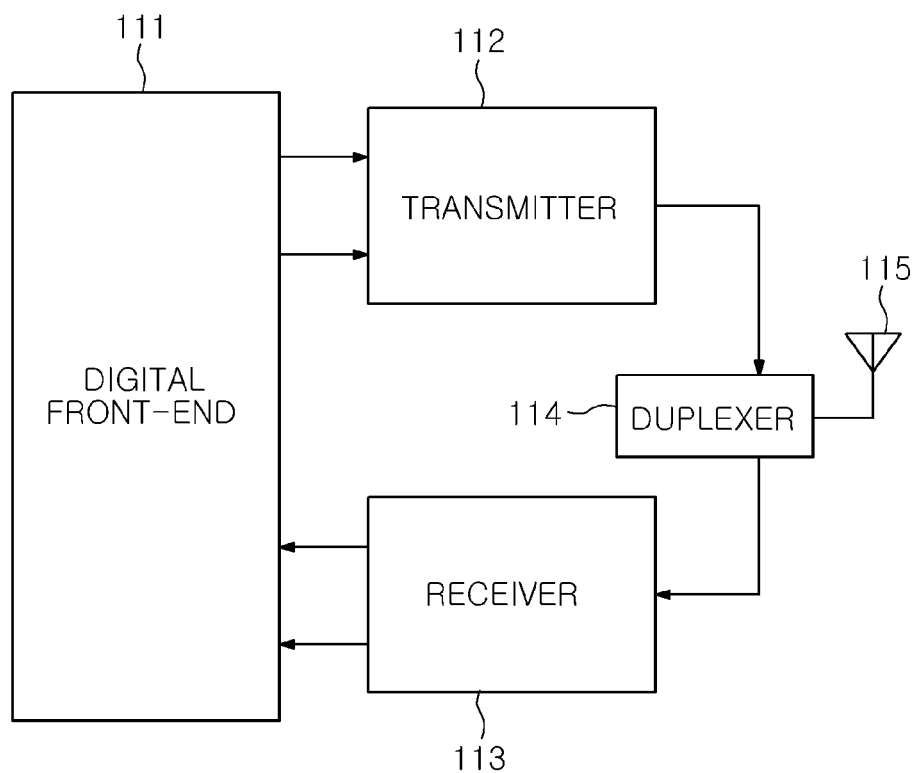
FIG. 1 shows the construction of a common wireless communication transceiver.
Figure 2:
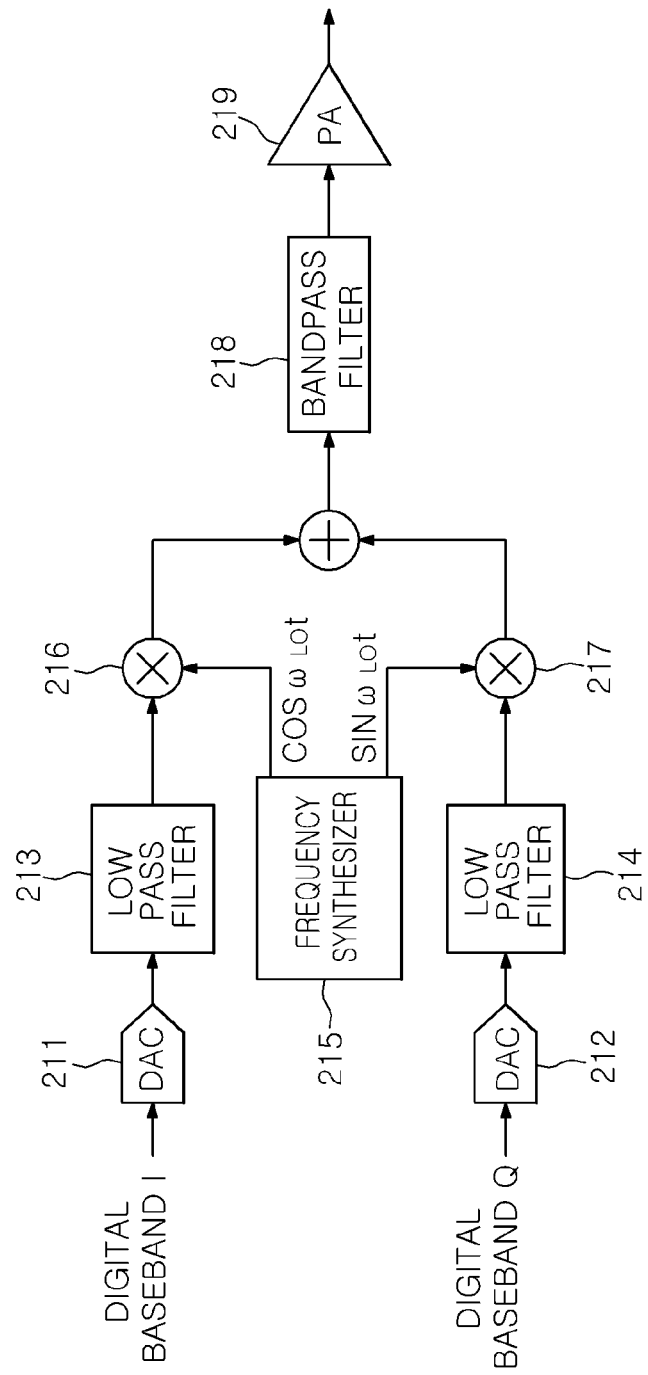
FIG. 2 shows the construction of the transmitter of a common analog circuit-based direct conversion structure.
Figure 3:
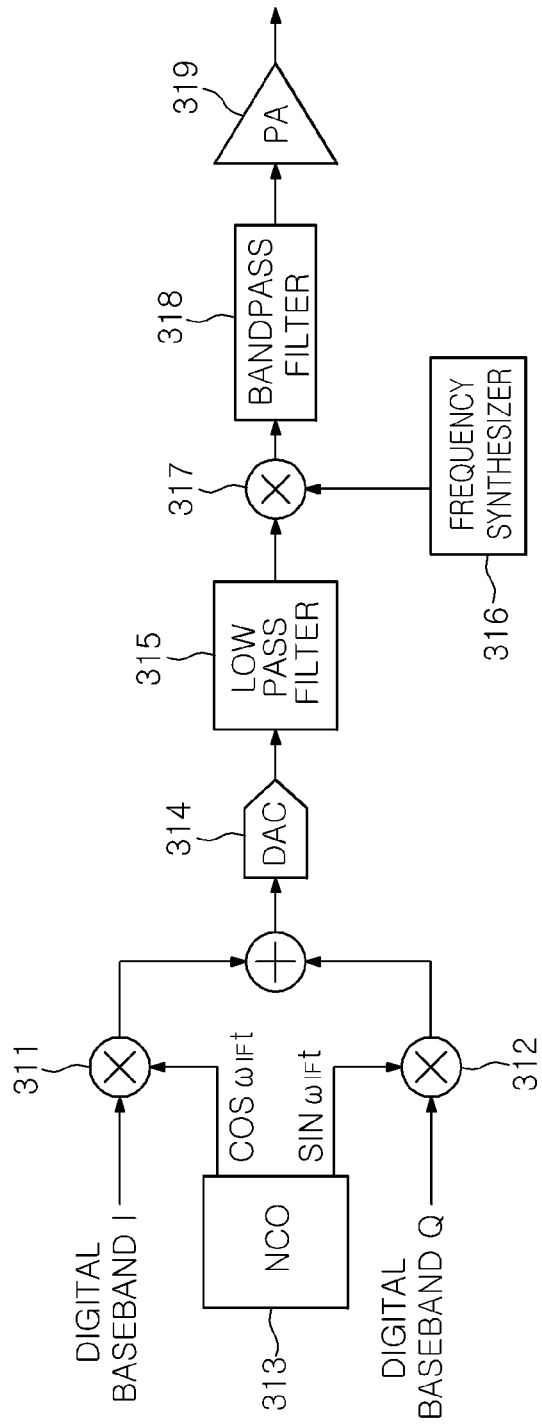
FIG. 3 shows the construction of the transmitter of a common digital-IF structure.
Figure 4:
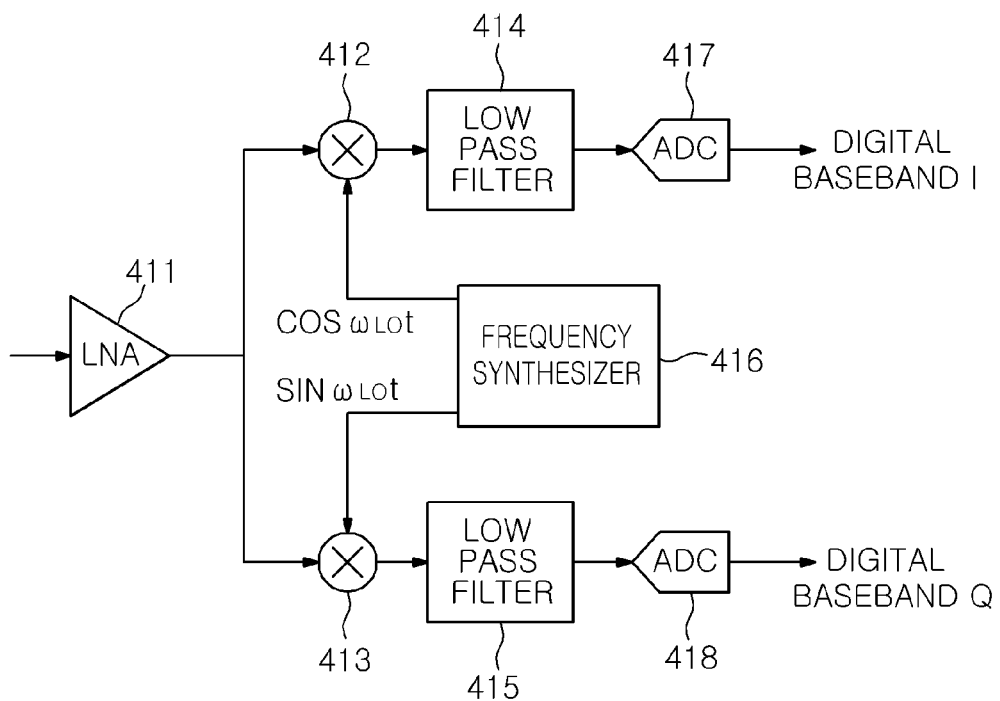
FIG. 4 shows the construction of the receiver of the common analog circuit-based direct conversion structure.
Figure 5:
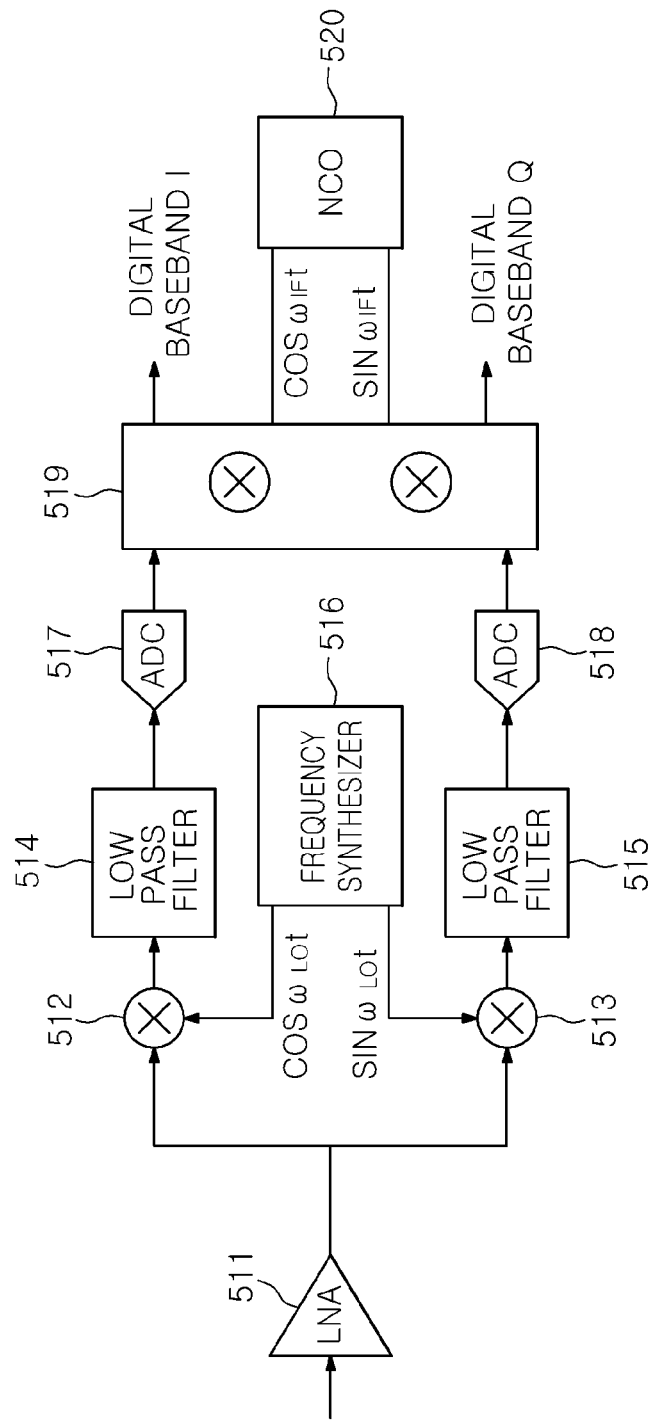
FIG. 5 shows the construction of the receiver of the common digital-IF structure.
Figure 6:
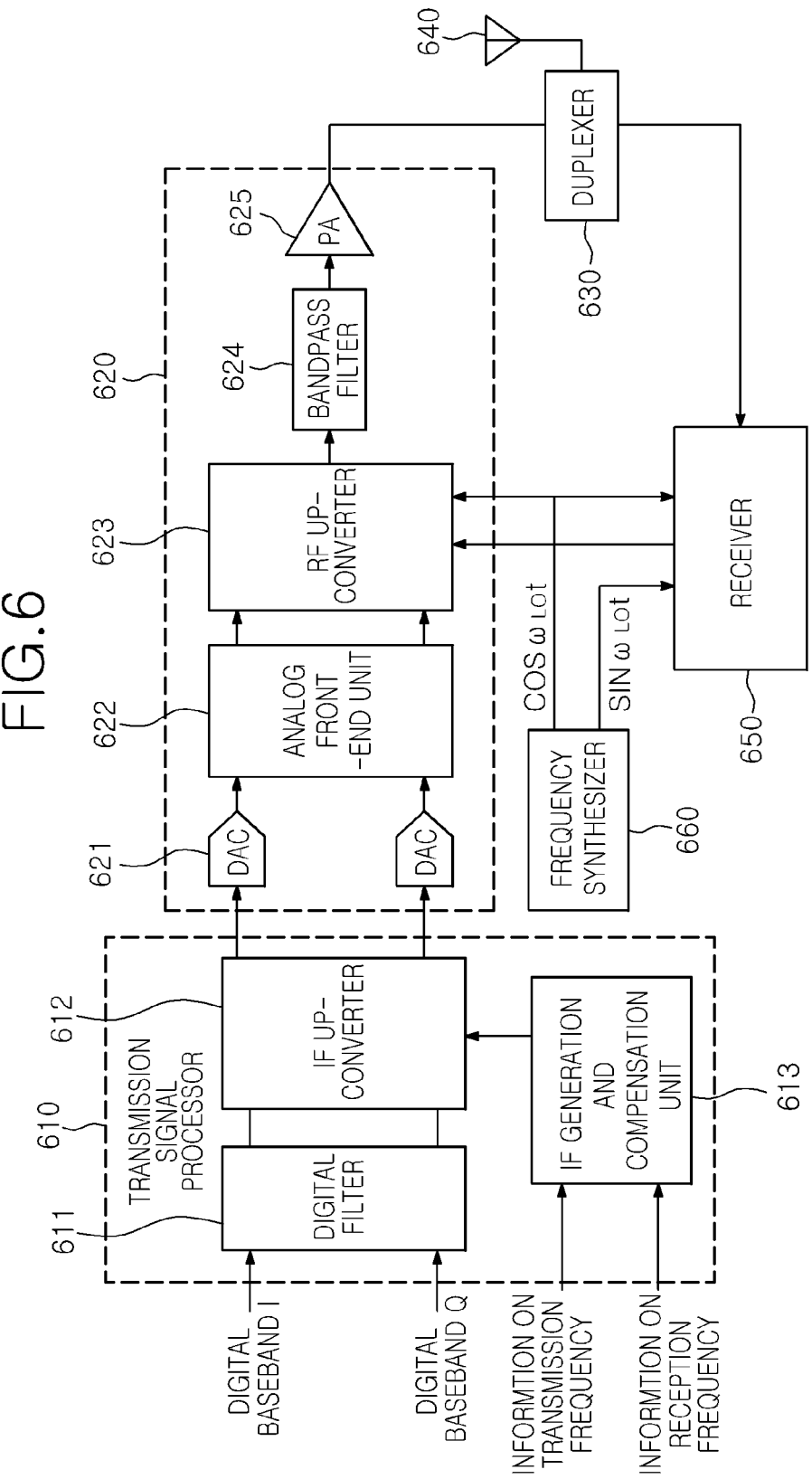
FIG. 6 shows the construction of a single frequency synthesizer based FDD transceiver in accordance with one embodiment of the present invention.
Figure 7:
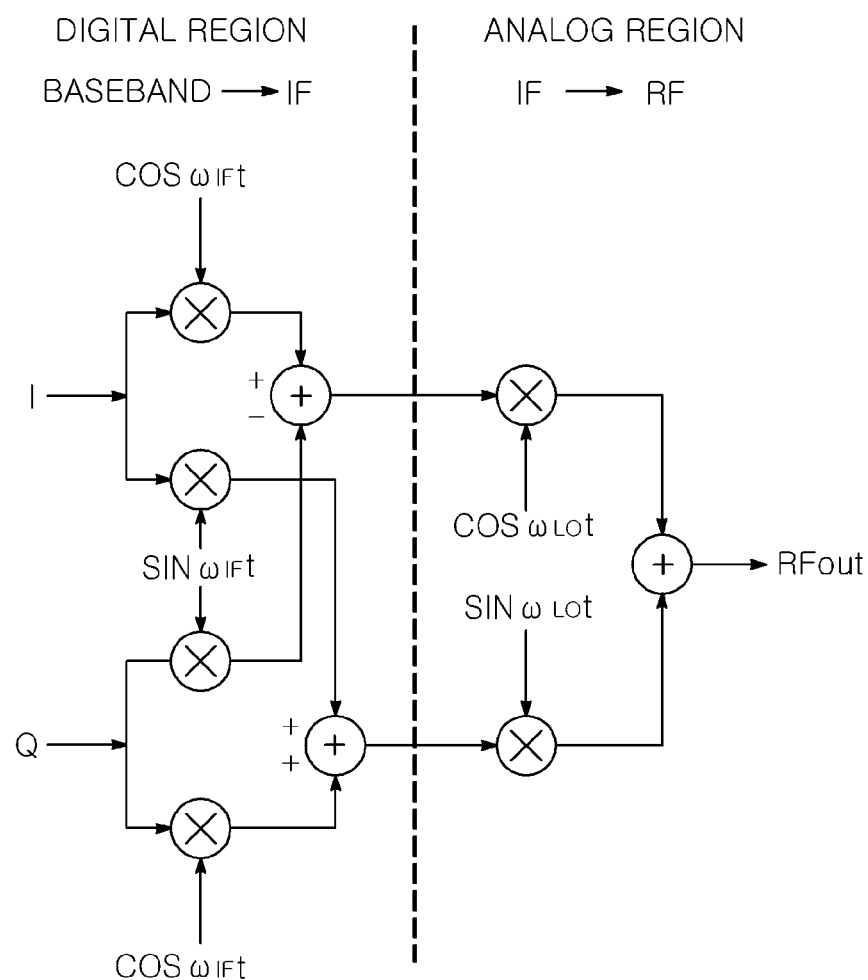
FIG. 7 shows a construction illustrating frequency up-conversion in the single frequency synthesizer-based FDD transceiver in accordance with one embodiment of the present invention.

FIG. 6 shows the construction of a single frequency synthesizer based FDD transceiver in accordance with one embodiment of the present invention, and FIG. 7 shows a construction illustrating frequency up-conversion in the single frequency synthesizer based FDD transceiver in accordance with one embodiment of the present invention.

As shown in FIG. 6, the single frequency synthesizer based FDD transceiver in accordance with one embodiment of the present invention includes a transmission signal processor 610, a transmitter 620, a duplexer 630, a receiver 650, and a frequency synthesizer 660.

The transmission signal processor 610 includes a digital filter 611 configured to sample baseband signals and remove sampling images from the baseband signals, an IF up-converter 612 configured to perform frequency up-conversion from the filtered signals of the digital filter 611 into IF band signals, and an IF generation and compensation unit 613 configured to generate an IF necessary for the frequency up-conversion into the IF band signals and compensate for the IF of a transmission frequency and a reception frequency.

Accordingly, the transmission signal processor 610 performs frequency up-conversion from the baseband signals to the IF band signals, receives the information on the transmission frequency and the information on the reception frequency, generates the IF for the frequency up-conversion into the IF band signals, and compensates for the IF of the transmission frequency and the reception frequency.

Here, the digital filter 611 enables the clock frequency of a digital circuit to be operated twice or faster than the IF when up-converting the baseband signals into the IF by up-sampling the baseband signals. In this case, an image folding problem according to the Nyquist theory, occurring when the clock frequency of the digital circuit does not operate at twice or higher than the IF, can be prevented. Furthermore, the digital filter 611 functions to remove sampling images occurring at positions corresponding to a multiple of a sampling frequency when performing up-sampling.

The IF up-converter 612 removes images using an image reject mixer. The IF generation and compensation unit 613 compensates for the IF based on a difference between the transmission frequency and the reception frequency.

The IF generation and compensation unit 613 compensates for frequencies when the carrier frequency of the frequency synthesizer 660 is sought to be changed and the output frequency of the transmitter 620 is sought to be fixed.

For example, when the reception frequency of the receiver 650 of a direct conversion structure is 2.15 GHz and the output frequency of the transmitter 620 of the direct conversion structure is 1.95 GHz, a carrier frequency generated from the frequency synthesizer 660 is 2.15 GHz and the IF of the transmitter 620 is 2.15 GHz−1.95 GHz=200 MHz.

The 200 MHz corresponds to a difference between a carrier frequency necessary for down-conversion in the receiver 650 and the output frequency of the transmitter 620.

When the reception frequency of the receiver 650 is 2.12 GHz and the output frequency of the transmitter 620 is sought to be fixed to 1.95 GHz, the carrier frequency generated from the frequency synthesizer 660 is changed into 2.12 GHz and the IF of the transmitter 620 is compensated for with 2.12 GHz−1.95 GHz=170 MHz.

When the reception frequency of the receiver 650 is 2.15 GHz and the output frequency of the transmitter 620 is changed into 1.97, the IF of the transmitter 620 is compensated with 2.15 GHz−1.97 GHz=180 MHz and the carrier frequency generated from the frequency synthesizer 660 is fixed.

The above method can also be applied to the case where a digital-IF structure is used in the receiver 650. In this case, a frequency generated from the frequency synthesizer 660 is used as a carrier frequency that is necessary when the generated frequency is down-converted from an RF band to an IF band and when the generated frequency is up-converted from an IF band to an RF band. When a transmission frequency and a reception frequency are changed, the IF of the transmission frequency and the reception frequency is compensated for according to circumstances.

The transmitter 620 converts the digital IF band signals, up-converted by the transmission signal processor 610, into analog signals, removes noise from the analog signals, performs frequency up-conversion from the analog signals into RF band signals, and amplifies and outputs the resulting signal.

To this end, the transmitter 620 includes DACs 621 configured to convert the digital IF band signals, subject to frequency up-converted through the IF up-converter 612, into analog signals, an analog front-end unit 622 configured to remove images from the analog signals outputted from the DACs 621 and control the amounts of the signals, an RF up-converter 623 configured to perform frequency up-conversion from the IF band signals of the analog front-end unit 622 into RF band signals, a bandpass filter 624 configured to remove spur and noise on a spectrum from the RF band signals up-converted by the RF up-converter 623, and a PA 625 configured to amplify the transmission power of the signal passing through the bandpass filter 624.

The analog front-end unit 622 removes images generating when the analog signals are converted through a low pass filter.

Furthermore, the RF up-converter 623 removes images using an image reject mixer when up-conversion is performed.

As shown in FIG. 7, frequency up-conversion is performed from a baseband to an IF band, and up-conversion is performed from the IF band into an RF band.

A frequency conversion method used in FIG. 7 corresponds to a digital-IF method of embodying the frequency up-conversion from the baseband to the IF band in a digital manner and embodying the frequency up-conversion from the IF band to the RF band in an analog manner.

Here, the frequency up-conversion from the baseband to the IF band uses an image reject mixer.

The diagram shown in FIG. 7 can be expressed by the following equation.

$$RFout = I\cos\omega_{LO}\cos\omega_{IF} - Q\cos\omega_{LO}\sin\omega_{IF} + I\sin\omega_{LO}\sin\omega_{IF} + Q\sin\omega_{LO}\cos\omega_{IF} = I(\cos\omega_{LO}\cos\omega_{IF} + \sin\omega_{LO}\sin\omega_{IF}) + Q(\sin\omega_{LO}\cos\omega_{IF} - \cos\omega_{LO}\sin\omega_{IF}) = I\cos(\omega_{LO} - \omega_{IF}) + Q\sin(\omega_{LO} - \omega_{IF})$$

Accordingly, the final output frequency becomes a desired $\omega_{LO}-\omega_{IF}$.

The duplexer 630 sends the RF band signal, amplified by the PA 625 of the transmitter 620, through an antenna 640.

The receiver 650 can have a direct conversion structure or a digital-IF structure. The receiver 650 performs low-noise signal amplification on an RF band signal received from the antenna 640 via the duplexer 630 and performs frequency down-conversion and analog signal processing on the RF band signal.

The frequency synthesizer 660 is shared by the transmitter 620 and the receiver 650. The frequency synthesizer 660 generates a carrier frequency for frequency up-conversion in the RF up-converter 623 and for frequency down-conversion in the receiver 650.

The carrier frequency generated from the frequency synthesizer 660 is a reception frequency.

Figure 8:
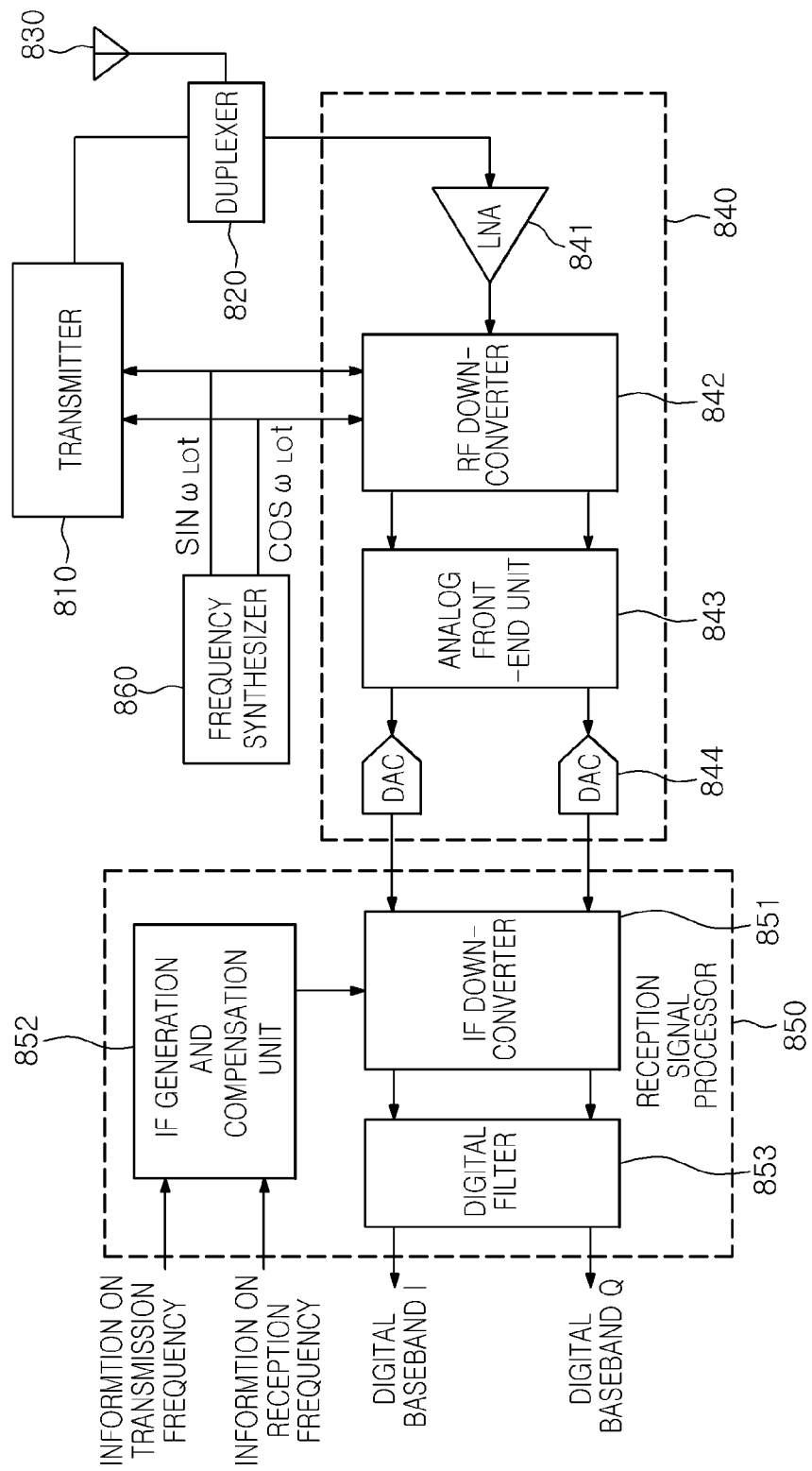
FIG. 8 shows the construction of a single frequency synthesizer based FDD transceiver in accordance with another embodiment of the present invention.

FIG. 8 shows the construction of a single frequency synthesizer based FDD transceiver in accordance with another embodiment of the present invention.

As shown in FIG. 8, the single frequency synthesizer based FDD transceiver includes a transmitter 810, a duplexer 820, a receiver 840, a reception signal processor 850, and a frequency synthesizer 860.

The transmitter 810 can have a direct conversion structure or a digital-IF structure. The transmitter 810 filters an analog baseband signal, performs frequency up-conversion from the analog baseband signal to an RF band, and performs the transmission power of the RF band signal.

The duplexer 820 sends the signal, amplified by the transmitter 810, through an antenna 830.

The receiver 840 performs low-noise signal amplification on the RF band signal received from the antenna 830 via the duplexer 820 and performs frequency down-conversion from the IF band signal to a digital signal.

To this end, the receiver 840 includes an LNA 841 configured to amplify the RF band signal received from the antenna 830 via the duplexer 820 in the state in which low noise is maintained, an RF down-converter 842 configured to perform frequency down-conversion the RF band signal, subjected to low noise amplification by the LNA 841, into IF band signals, an analog front-end unit 843 configured to remove aliasing images from the IF band signals down-converted by the RF down-converter 842, and an ADC 844 configured to convert the signals of the analog front-end unit 843 into digital signals.

The reception signal processor 850 includes an IF down-converter 851 configured to perform frequency down-conversion from the digital IF band signals into baseband signals, an IF generation and compensation unit 852 configured to generate an IF necessary when the frequency down-conversion from the IF band signals into the baseband signals is performed, receive information on a transmission frequency and information on a reception frequency, and compensate for the IF of the transmission frequency and the reception frequency, and a digital filter 853 configured to sample the baseband signals converted by the IF down-converter 851 and output the resulting signals.

As described above, frequency down-conversion from the digital IF band signals, outputted from the receiver 840, to the baseband signals is performed. The baseband signals are sampled and outputted, and information on a transmission frequency and information on a reception frequency are received. An IF for frequency down-conversion from the transmission frequency and the reception frequency to baseband signals are generated, and the IF of the transmission frequency and the reception frequency is compensated for.

The frequency synthesizer 860 generates a carrier frequency for the frequency up-conversion in the transmitter 810 and for frequency down-conversion in the RF down-converter 842.

The carrier frequency generated from the frequency synthesizer 860 is a transmission frequency.

The IF down-converter 842 removes images using an image reject mixer. The IF generation and compensation unit 852 compensates for frequencies when the carrier frequency of the frequency synthesizer 860 is sought to be changed and the RF band output frequency of the receiver 840 is sought to be fixed.

For example, when the transmission frequency of the transmitter 810 of a direct conversion structure is 1.95 GHz and the reception frequency of the receiver 840 of the direct conversion structure is 2.15 GHz, a carrier frequency generated from the frequency synthesizer 860 is 1.95 GHz and the IF of the receiver 840 is 2.15 GHz–1.95 GHz=200 MHz.

When the reception frequency is sought to be changed into 2.12 GHz and the transmission frequency is sought to be fixed to 1.95 GHz, the IF of the receiver 840 is compensated with 2.12 GHz–1.95 GHz=170 MHz and the carrier frequency of the frequency synthesizer 860 is fixed.

When the reception frequency is 2.15 GHz and the transmission frequency is sought to be changed into 1.97 GHz, the carrier frequency of the frequency synthesizer 860 is changed into 1.97 GHz and the IF of the receiver 840 is compensated for with 2.15 GHz–1.97 GHz=180 MHz.

The above method may also be applied to the case where the transmitter 810 uses a digital-IF structure. In this case, a carrier frequency necessary when the transmitter 810 up-converts an IF band signal into an RF band signal is used as a frequency necessary when the receiver 840 down-converts the RF band signal into an IF band signal, and an IF suitable for the signals is used.

As described above, in accordance with the single frequency synthesizer based FDD transceiver according to the present invention, a single frequency synthesizer generates and provides a carrier frequency so that frequency up-conversion and frequency down-conversion can be performed at the time of transmission and reception. Accordingly, the area, power consumption, and design complexity of the entire system can be reduced, and the performance of the system can be improved.

Furthermore, the present invention keeps pace with the flow of the semiconductor industry that tries to maximize the signal processing of a digital circuit because the role of the digital circuit becomes important.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A single frequency synthesizer based frequency division duplex (FDD) transceiver, comprising:
a transmission signal processor configured to perform frequency up-conversion from baseband signals into intermediate frequency (IF) band signals, receive information on a transmission frequency and information on a reception frequency, generate an IF for frequency up-conversion from the transmission frequency to the IF band signals, and compensate for the IF based on a difference between the transmission frequency and the reception frequency;

a transmitter configured to convert the digital IF band signals, up-converted by the transmission signal processor, into analog signals, remove noise from the analog signals, perform frequency up-conversion from the analog signals into radio frequency (RF) band signals, amplify the RF band signals, and output the amplified RF band signal;

a duplexer configured to send the RF band signal, outputted from the transmitter, through an antenna;

a receiver configured to perform low-noise signal amplification on the RF band signal received from the antenna via the duplexer and perform frequency down-conversion and analog signal processing on the amplified RF band signal; and a frequency synthesizer configured to generate a carrier frequency for the frequency up-conversion in the transmitter and the frequency down-conversion in the receiver; wherein the transmission signal processor compensates for the IF when the carrier frequency is to be changed and an RF band output frequency of the receiver is to be fixed, or when the RF band output frequency of the receiver is to be changed and the carrier frequency is to be fixed.

2. The single frequency synthesizer based FDD transceiver of claim 1, wherein the transmission signal processor comprises:
   a digital filter configured to sample the baseband signals and remove sampling images from the baseband signals;
   an IF up-converter configured to perform the frequency up-conversion from the signals, filtered by the digital filter, into the IF bands; and
   an IF generation and compensation unit configured to receive the information on the transmission frequency and the information on the reception frequency, generate the IF necessary for the frequency up-conversion in the IF band signals, and compensate for the IF.

3. The single frequency synthesizer based FDD transceiver of claim 2, wherein the digital filter up-samples the baseband signals.

4. The single frequency synthesizer based FDD transceiver of claim 1, wherein the carrier frequency generated from the frequency synthesizer is a reception frequency.

5. The single frequency synthesizer based FDD transceiver of claim 1, wherein the receiver has a direct conversion structure or a digital-IF structure.

6. A single frequency synthesizer based frequency division duplex (FDD) transceiver, comprising:
   a transmitter configured to filter an analog baseband signal, perform frequency up-conversion from the analog baseband signal to a radio frequency (RF) band signal, and amplify transmission power of the RF band signal;
   a duplexer configured to send the RF band signal, amplified by the transmitter, through an antenna;
   a receiver configured to perform low-noise signal amplification on the RF band signal received from the antenna via the duplexer, perform frequency down-conversion from the RF band signal to intermediate frequency (IF) band signals, and convert the IF band signals into digital IF band signals;
   a reception signal processor configured to perform frequency down-conversion from the digital IF band signals of the receiver to the baseband signals, sample the baseband signals, output the sampled baseband signals, receive information on a transmission frequency and information on a reception frequency, generate an IF for frequency down-conversion from the reception frequency to the baseband signals, and compensate for the IF based on a difference between the transmission frequency and the reception frequency; and
   a frequency synthesizer configured to generate a carrier frequency for the frequency up-conversion in the transmitter and for the frequency down-conversion in the receiver; wherein the reception signal processor compensates for the IF when the carrier frequency is to be changed and an RF band output frequency of the receiver is to be fixed, or when the RF band output frequency of the receiver is to be changed and the carrier frequency is to be fixed.

7. The single frequency synthesizer based FDD transceiver of claim 6, wherein the transmitter has a direct conversion structure or a digital-IF structure.

8. The single frequency synthesizer based FDD transceiver of claim 6, wherein the reception signal processor comprises:
   an IF down-converter configured to perform frequency down-conversion from the digital IF band signals to the baseband signals;
   an IF generation and compensation unit configured to generate the IF necessary for the frequency down-conversion from the IF band signals to the baseband signals, receive the information on the transmission frequency and the information on the reception frequency, and compensate for the IF of the transmission frequency and the reception frequency; and
   a digital filter configured to sample the baseband signals converted by the IF down-converter and output the sampled signals.

9. The single frequency synthesizer based FDD transceiver of claim 6, wherein the carrier frequency generated from the frequency synthesizer is a transmission frequency.

* * * * *